Aug. 3, 1965  S. H. HINE  3,198,097
ILLUMINATING APPARATUS
Filed Dec. 20, 1962  2 Sheets-Sheet 1

INVENTOR.
Sheldon H. Hine,
BY Hood, Gust & Irish
Attorneys.

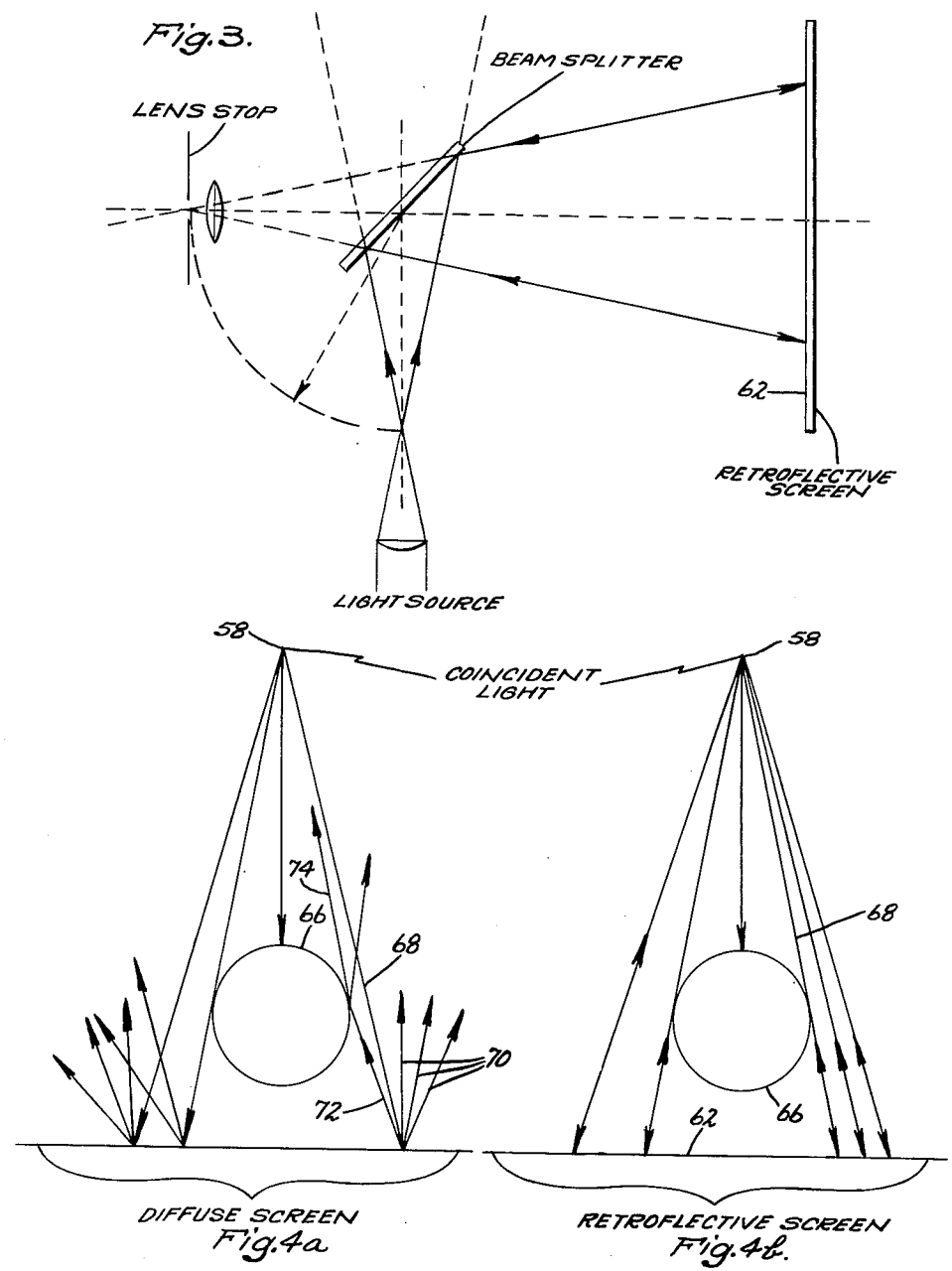

United States Patent Office 3,198,097
Patented Aug. 3, 1965

3,198,097
ILLUMINATING APPARATUS
Sheldon H. Hine, 2538 John St., Fort Wayne, Ind.
Filed Dec. 20, 1962, Ser. No. 246,123
7 Claims. (Cl. 95—11)

The present invention relates to illuminating apparatus and more particularly to apparatus for illuminating an object to be photographed or televised.

While the present invention has particular utility in the field of photography, its use in other fields such as television, medicine and the like are equally appropriate; however, for purposes of simplicity and convenience in explaining and disclosing the invention, its applicability to the field of photography will be discussed.

In photographing virtually any subject, its appearance and character and even its apparent shape and size can be varied by changing the lighting employed for illuminating the subject. As an example, portions of the subject may be concealed or rendered less visible by shadows cast by other portions of the subject. Where absolute fidelity, as distinguished from artistic enhancement, is desired, apparatus and methods of photography heretofore employed have been unable to achieve the elimination of obscuring or shape-altering shadows without sacrificing to an unreasonable extent the modeling, brilliance or surface character of the subject.

It has long been realized that the apparent distortion of complex objects in photographs is due in large measure to the presence of penumbral shadows, and that the reduction of such shadows by conventional means also reduced appreciably the fullness and brilliance of modeling. In commercial practice, the reproduction of photographs in printed form where the subject was to be clearly shown with high integrity of outline against a pure white background, penumbral shadows have been removed in whole or in part by painstaking blocking or retouching of the photographic negatives. This practice has been quite time-consuming and costly and has been entirely dependent upon the proficiency of the retoucher. Lack of skill on the part of the retoucher has resulted in material diminution of the accuracy and reliability of subject outline as well as the reproduced fidelity of the subject itself.

Thus, with known apparatuses, methods and techniques of producing photographs or photographic negatives for use in making printed reproductions, the expense and consumed time have been substantial and in some instances prohibitive.

Through the use of the present invention, it is a simple matter to produce photographs of subjects, which carry a maximum degree of pictorial information free from degrading shadows, against a pure white background with purest integrity of subject outline. The net result is a photograph which is a virtually finished reproduction copy which may be used directly for reproduction according to common printing devices and methods such as those used in printing newspapers, textbooks, magazines and the like. The steps of blocking, retouching and the like of the negatives are substantially eliminated, thereby providing a substantial savings from the standpoints of both time and economy.

It is, therefore, an object of this invention to provide illuminating apparatus whereby photographs which carry a maximum degree of pictorial information free from degrading shadows on a pure white background with purest integrity of subject outline may be taken.

Another object of this invention is to provide illuminating apparatus which may be used in such a manner as to appreciably reduce or eliminate the requirements of retouching prior to the reproduction of such photographs by common printing methods.

It is yet another object of this invention to provide illuminating apparatus which may be easily and reliably used in such a manner as to appreciably reduce or eliminate obscuring shadows on a subject with the subject thereby being revealed in purest form.

Other objects will become apparent as the description proceeds.

The above-mentioned and other features and objects of this invention and the manner of attaining them will become more apparent and the invention itself will be best understood by reference to the following description of an embodiment of the invention taken in conjunction with the accompanying drawings, wherein:

FIG. 3 is a geometric illustration of the light optics of a portion of this invention and is used in connection with an explanation thereof; and FIGS. 4a and 4b are diagrammatic representations of the illumination patterns produced by conventional prior art devices and the present invention, respectively.

Figure 1:
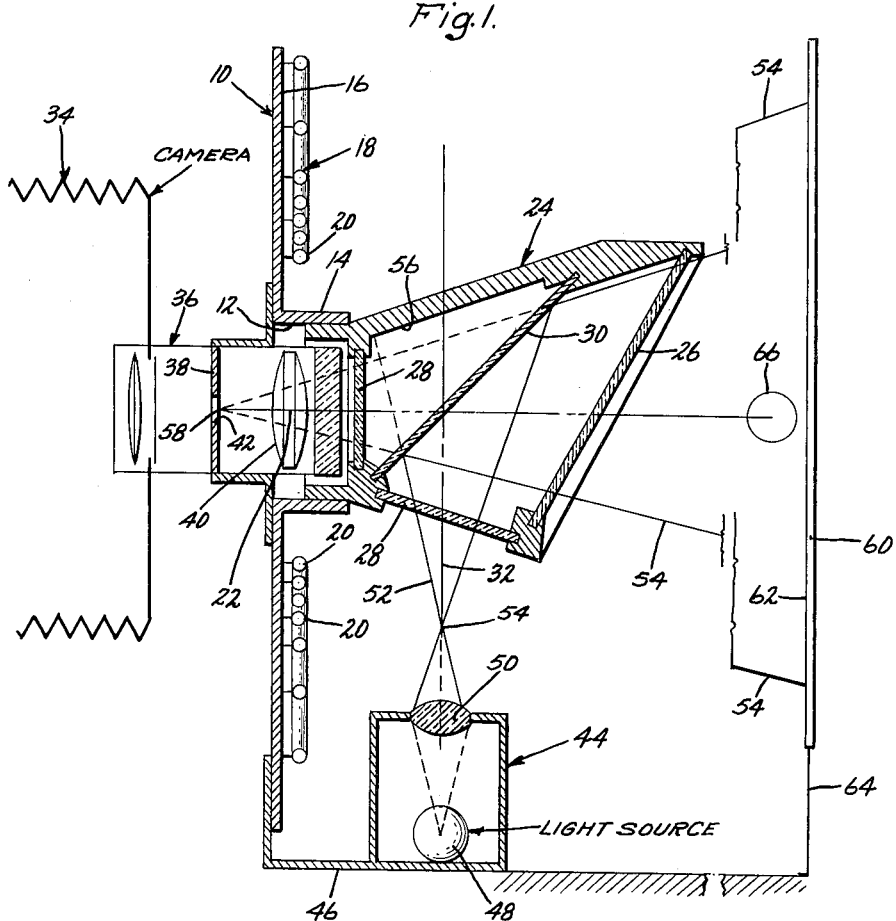
FIG. 1 is a fragmentary cross-sectional illustration of an embodiment of this invention.
Figure 2:
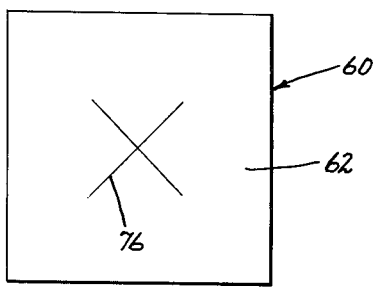
FIG. 2 is a front plan view of the retro-reflective screen of FIG. 1.

Referring to the drawings, and more particularly to FIGS. 1 and 2, a substantially flat, sheet-like supporting member 10 is shown as having a central opening 12 which is defined by a forwardly projecting tubular flange 14. On the forward surface 16 of the supporting member 10 is mounted a large area, radially-graded annular illuminator or light source which is generally indicated by the reference numeral 18. This source 18 is composed of a plurality of turns of glass tubing filled with neon gas or the like which will fluoresce or luminesce when a suitable electrical field or power is applied thereto. The glass tubing filled with neon gas is formed, in one embodiment of this invention, in a spiral coil or in a series of concentric circles about the tubular flange or lens support 14, the inner turn 20 being located as closely to the lens support 14 as possible as will become more apparent from the following description. The remaining turns or circles radially outwardly from the inner turn 20 have a spacing therebetween which increases progressively in a radially outward direction such that the spacing between the two outermost turns is greater than that between any other two turns in the light source. As shown more clearly in FIG. 1, the light source 18 is contained in a single plane normal to the axis 22 of the lens support 14 and is of such construction as will produce maximum brillancy at or near its central portion with average brilliancy decreasing progressively radially outwardly from this central portion. This particular light source 18 is disclosed specifically and in more detail in my prior Patent No. 2,763,772.

Secured to the lens support 14 is a hermetically sealed, preferably evacuated housing which is generally indicated by the reference numeral 24. This housing generally is fabricated of rigid, self-supporting material and is provided in the opposite end portions thereof with suitable transparent front and rear windows 26 and 28, respectively. A third window 28 of transparent glass or similar suitable material is provided in the bottom portion of the housing 24 as shown. It may be stated at this point that the housing 24 is designed and constructed to be as small as possible and ideally to have no parts which project radially outwardly beyond the radial extent of the innermost turn 20. In other words, the housing 24 should not lie in the path of any light ray projected forwardly from the turn 20 at right angles to the plane of the source 18.

A conventional beam splitter or pellicle 30 is rigidly mounted inside the housing 24 in the position shown, and preferably consists of a flat plate of semi-reflective glass. The beam splitter 30 is set at an angle of 45° to the axis of the lens support 14 (this axis hereinafter being referred to as an "optical axis") and at the same angle to a second optical axis 32 which intersects the first angle 22 at right angles. Also, the intersection of these two axes is situated such as to coincide with a point in the central portion of the front surface of the beam splitter 30 as shown.

A camera generally indicated by the numeral 34 is shown as having a conventional lens system 36 provided with a lens stop 38 and a convex lens 40. The lens stop 38 is provided with the usual aperture 42 which in the lens system 36 illustrated may be regarded as coinciding with the viewing center of the lens system. The optical axis of the lens system 36 is made to coincide with the previously mentioned axis 22.

A conventional light source or projector, indicated generally by the numeral 44, is suitably mounted on the support 10 by means of a frame structure 46. The projector 44 is provided with a lamp device 48 and a lens 50 which produces a divergent light beam 52 having a crossover at, for example, 54. The projector 44 is positioned such that the beam 52 is directed through the window 28 and onto the beam splitter 30. The axis of the beam 52 should coincide with the previously mentioned axis 32. Because of the geometric relationships previously described, a portion of the beam 52 is reflected forwardly from the front surface of the beam splitter 30 in the form of the divergent beam 54 which passes through the front window 26 of the housing 24. That portion of the beam 52 which is not so reflected passes through the beam splitter 30 and is absorbed by a suitable light trap 56 mounted in the upper portion of the housing 24.

The apparatus described thus far is further dimensioned and designed such that the rearward projection of the divergent beam 54 through the beam splitter 30 converges to a point 58 in the central portion of the diaphragm aperture 42. Additionally, the lens system 36 preferably is of such design that its viewing angle coincides with or is slightly smaller than the angular outline of the beam 54. The reason for this will be explained more fully hereinafter.

Situated a suitable distance forwardly of the housing 24 is a background screen 60 having a front surface 62 covered with retro-reflective material. The screen 60 is supported by means of a stationary stand which is indicated diagrammatically by the vertical line 64. The retro-reflective material or surface 62 is conventional and comprises a multiplicity of tiny, contiguous spherical lenses, beads or lenticulae that are placed or mounted over a specular reflective surface. This provides a retro-directive reflective system whereby light passing through the lenticulae focuses on the specular reflecting surface and is reflected back through the small lenses in essentially the same direction from which it came. In other words, the path of the reflected light substantially coincides with the path of the incident light.

In operation, the projector 44 is energized and emits the beam 52 which emerges from the beam splitter 30 as the divergent beam 54. This divergent beam 54 falls onto and illuminates the indicated surface area of the screen 60. At the same time, the co-planar light source 18 is energized and it illuminates the surface 62 of the screen 60 and any object, such as the ball 66, which is placed in front thereof. The camera 34 is thereupon operated in the conventional manner for taking a photograph of the object 66 against the background of the screen surface 62.

Assuming that the camera is properly adjusted with respect to aperture size and focus, a photograph will be produced wherein the ball 60 will be clearly revealed against a bright, white background with the outline of the ball being sharp and clear, free from penumbral shadows. This negative would need no retouching or blocking for use in the reproduction thereof by the usual printing methods.

With respect to the theory of operation, the sharp outline of the object against the background and the pure white result in the background results from the coincident illumination provided by the projector 44, beam splitter 30 and the retro-reflective material of the screen surface 62. By means of the beam splitter 30 and the projector 44, a virtual light source is established at the intersection of the optical axis 22 and (for practical purposes) the plane of the lens stop 38. In other words, this virtual light source is established at the point 58. Being so located, this virtual source is inside the lens system at its effective center. Thus, the viewing angle of the lens system coincides substantially precisely with the angle of divergency of the illuminating beam 54. In a less precise arrangement, the axes of the beam 54 and the viewing angle of the lens system should coincide and the viewing angle may be smaller than the divergency of the beam 54. When these conditions are established, parallax is eliminated and all details are illuminated precisely and in the same respects as the lens views them. The geometry of this illuminating and viewing system is illustrated in FIG. 3.

If the screen surface 62 were not made of a retro-reflective material such that diffuse reflection of incident light would result, only a small portion of this reflected light would find its way back to the lens stop 38. Such diffuse reflection is illustrated in FIG. 4a wherein an incident ray 68 is shown as being variously reflected along the paths of the arrows 70. If the subject 66 has a glossy surface, one of the reflected rays 72 would strike the surface as shown and be reflected onwardly along the path 74 to the lens, thereby destroying the outline.

In the situation of the screen surface being of retro-reflective material as previously explained, all incident radiation 68a is reflected rearwardly along essentially the same paths as indicated by the double-ended arrows in FIG. 4b. By this means, no random light reaches the surface of the ball 66 such that the outline of the ball in the finished photograph is not degraded.

By using only the projector 44 in combination with the beam splitter 30 and extinguishing the co-planar source 18, the ball 66 can be made to appear in the finished photograph as a black circle having a sharp, clean outline on a pure white background. The reason for this is that the efficiency of reflection from the retro-reflective surface 62 is so much greater than that from the specular or diffuse surface on the ball 66 that insufficient light returns from the latter to reveal the detail thereof. This detail, however, can be brought forth with highest degree of fidelity through the use of the co-planar light source 18. In the finished photograph, there then results a clearly defined, natural-appearing object which is imaged in sharp outline against a pure white background. The integrity of subject outline is preserved to virtual perfection, but is substantially enhanced by the strong, incident angle modeling and dark edge effect produced by the beam 54. By varying the brilliancy in the beam 54, the photographic-negative density of the background area can be built to any desired degree. In effect, this produces simultaneously an optical mask which registers perfectly with the subject outline.

In the graphic arts where it is desired to reproduce drawings, diagrams, printed material and the like on a clean white background, the present invention is particularly useful. One method of reproducing a drawing is to make the drawing directly onto the retro-reflective surface 62 as illustrated in FIG. 2 by the X shape 76 which may consist merely of pencil lines. In the alternative, a transparent overlay having the X shape 76 thereon and laid against the surface 62 may be used. A photograph taken of such a drawing in accordance with the procedures outlined hereinabove can result in a pure black drawing on a clean white background. In photographing the original drawing, the coplanar source 18 would not be used, only the projector 44 being required.

By placing subjects to be combined both graphically and photographically on or near the retro-screen 62, both a continuous tone negative (a standardized photograph) and graphic description drawn on the retro-screen 62 can be simultaneously combined in one negative.

While I have described above the principles of my invention in connection with specific apparatus, it is to be clearly understood that this description is made only by way of example and not as a limitation to the scope of my invention.

What is claimed is:

1. Illuminating apparatus comprising a support having a central lens-receiving opening therein, a plurality of annular coplanar light sources concentrically encircling said opening and carried by said support, said annular sources being spaced apart progressively greater distances radially outwardly from said opening; an hermetically sealed housing having spaced-apart oppositely disposed front and rear transparent windows, said housing being carried by said support with said rear window being in optical alignment with said opening, said housing having a size which radially lies within the innermost of said annular sources, said housing having a third window in a side which is transverse to said front and rear windows, a beam splitter fixedly mounted in said housing at an angle of 45° to a first straight optical axis which passes through said opening and said front and rear windows, said beam splitter also being disposed at an angle of 45° to a second straight optical axis which passes through said third window, said first and second optical axes intersecting at right angles and said beam splitter coinciding with this intersection; a camera provided with a lens system having an optical center, said lens system being disposed in registry with said lens-receiving opening; a source of light which emits a divergent beam of light along said second axis through said third window and onto said beam splitter, said divergent source being operatively mounted on said support, said beam splitter reflecting said divergent beam along a second divergent path which passes through said front window, the backward projection of said second divergent path passing through said beam splitter and converging at a point which coincides with the viewing center of said lens system, said second path having a straight axis which coincides with said first axis, the plane of said coplanar light sources being at right angles to said first axis; a screen of retro-reflective material having an extended area surface transverse to said first axis, said screen being disposed to be intersected by said second divergent path, and means for holding said screen in position with respect to said support whereby incident light rays which define said divergent path are reflected from said screen rearwardly and converge onto said viewing center.

2. Illuminating apparatus comprising a support having a central lens-receiving opening therein, a plurality of annular coplanar light sources concentrically encircling said opening and carried by said support, said annular sources being spaced apart progressively greater distances radially outwardly from said opening; an hermetically sealed housing having spaced-apart oppositely disposed front and rear transparent windows, said housing being carried by said support with said rear window being in optical alignment with said opening, said housing having a size which radially lies within the innermost of said annular sources, said housing having a third window in a side which is transverse to said front and rear windows, a beam splitter fixedly mounted in said housing at an angle of 45° to a first straight optical axis which passes through said opening and said front and rear windows, said beam splitter also being disposed at an angle of 45° to a second straight optical axis which passes through said third window, said first and second optical axes intersecting at right angles and said beam splitter coinciding with this intersection; a camera provided with a lens system having an optical center, said lens system being disposed in registry with said lens-receiving opening; a source of light which emits a divergent beam of light along said second axis through said third window and onto said beam splitter, said divergent source being operatively mounted on said support, said beam splitter reflecting said divergent beam along a second divergent path which passes through said front window, the backward projection of said second divergent path passing through said beam splitter and converging at a point which coincides with the viewing center of said lens system, said second path having a straight axis which coincides with said first axis, the plane of said coplanar light sources being at right angles to said first axis.

3. Illuminating apparatus comprising a support having a central lens-receiving opening therein, a plurality of annular coplanar light sources concentrically encircling said opening and carried by said support, said annular sources being spaced apart progressively greater distances radially outwardly from said opening; a beam splitter, means fixedly mounting said beam splitter at an angle of 45° to a first straight optical axis which passes through said opening, said beam splitter also being positioned at an angle of 45° to a second straight optical axis which intersects said first axis at right angles, said beam splitter coinciding with this intersection; a camera provided with a lens system having a viewing center, said lens system being disposed in registry with said lens-receiving opening; a source of light which emits a divergent beam of light along said second axis and onto said beam splitter, said divergent source being operatively mounted on said support, said beam splitter reflecting said divergent beam along a second divergent path, the backward projection of said second divergent path passing through said beam splitter and converging at a point which coincides with the viewing center of said lens system, said second path having a straight axis which coincides with said first axis, the plane of said coplanar light sources being at right angles to said first axis; a screen of retro-reflective material having an extended area surface transverse to said first axis, said screen being disposed to be intersected by said second divergent path, and means for holding said screen in position with respect to said support whereby incident light rays which define said divergent path are reflected from said screen rearwardly and converge onto said viewing center.

4. Illuminating apparatus comprising an area light source having a front light-emitting side which extends over a predetermined area about a central region, said source including light-emitting portions arranged in radial depth around said central region and radiating forwardly, the portions of said source adjacent to said central region emitting forwardly the most intense light with the other light-emitting portions emitting forwardly less intense light in a pattern which progressively decreases outwardly from said central region; a second source of light which emits rays along a divergent path, a beam splitter positioned in the path of said divergent rays and serving to reflect at least a portion of said rays along a second divergent path which extends forwardly of said area light source and which is angularly related to said first path, means for mounting said second source and said beam splitter such that the backward projection of said second path rays pass through said beam splitter and converge to a virtual point and the axis of said second path passes through said central region; camera means having a viewing center which substantially coincides with said point such that the apex and axis of the viewing angle of said camera means coincide substantially with the apex and axis of said second path; and a screen of retro-reflective material having an extended area surface spaced forwardly from said beam splitter and positioned transversely to said second path, whereby incident rays in said divergent path are reflected substantially oppositely rearwardly from said screen into convergence at a location which substantially coincides with said virtual point.

5. Illuminating apparatus comprising a hermetically sealed housing having spaced apart oppositely disposed front and rear transparent windows, said housing having a third window in a side which is transverse to said front and rear windows, a beam splitter fixedly mounted in said housing at an angle of 45° to a first straight optical axis which passes through said front and rear windows, said beam splitter also being disposed at an angle of 45° to a second straight axis which passes through said third window, said first and second axes intersecting at right angles and said beam splitter being further located at this intersection, a source of light which emits a divergent beam of light along said second axis and onto said beam splitter, said beam splitter reflecting said divergent beam along a second divergent path which passes through said front window, the backward projection of said second divergent path passing through said beam splitter and said rear window and converging at a point to the rear of said rear window, and a screen of retro-reflective material having an extended area surface transverse to said first axis, said screen being disposed to intercept at least a portion of said second divergent path whereby incident radiation in said second path will reflect substantially oppositely from said screen to converge onto said point.

6. Illuminating apparatus comprising an area light source having a front light-emitting side which extends over a predetermined area about a central region, said source including light-emitting portions arranged in radial depth around said central region and radiating forwardly, the portions of said source adjacent to said central region emitting forwardly the most intense light with the other light-emitting portions emitting forwardly less intense light in a pattern which progressively decreases outwardly from said central region; a second source of light which emits rays along a divergent path, a beam splitter positioned in the path of said divergent rays and serving to reflect at least a portion of said rays along a second divergent path which extends forwardly of said area light source and which is angularly related to said first path, means for mounting said second source and said beam splitter such that the backward projection of said second path rays pass through said beam splitter and converge to a virtual point; and a screen of retro-reflective material having an extended area surface spaced forwardly from said beam splitter and positioned transversely to said second path, whereby incident rays in said divergent path are reflected substantially oppositely rearwardly from said screen into convergence at a location which substantially coincides with said virtual point.

7. Illuminating apparatus comprising an area light source having a front light-emitting side which extends over a predetermined area about a central region, said source including light-emitting portions arranged in radial depth around said central region and radiating forwardly, a second source of light which emits rays along a divergent path, a beam splitter positioned in the path of said divergent rays and serving to reflect at least a portion of said rays along a second divergent path which extends forwardly and which is angularly related to said first path, means for mounting said second source and said beam splitter such that the backward projection of said second path rays pass through said beam splitter and converge to a virtual point, and a screen of retro-reflective material having an extended area surface spaced forwardly from said beam splitter and positioned transversely to said second path, whereby incident rays in said divergent path are reflected substantially oppositely rearwardly from said screen into convergence at a location which substantially coincides with said virtual point.

References Cited by the Examiner

UNITED STATES PATENTS

| | | | |
|---|---|---|---|
| 2,292,044 | 8/42 | Bucky | 95—11 |
| 2,541,016 | 2/51 | Allen | 95—14 |
| 2,642,518 | 6/53 | Bates | 240—2 |
| 2,727,427 | 12/55 | Jenkins | 88—16 |
| 2,763,772 | 9/56 | Hine | 240—1.3 |
| 3,034,406 | 5/62 | McKenzie | 88—28.9 X |

FOREIGN PATENTS 768,394    2/57    Great Britain.

EVON C. BLUNK, *Primary Examiner.*

JOHN M. HORAN, NORTON ANSHER, *Examiners.*